United States Patent
Xin

(10) Patent No.: US 10,152,420 B2
(45) Date of Patent: Dec. 11, 2018

(54) MULTI-WAY SET ASSOCIATIVE CACHE AND PROCESSING METHOD THEREOF

(71) Applicant: Huawei Technologies Co., Ltd., Shenzhen (CN)

(72) Inventor: Hengchao Xin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 34 days.

(21) Appl. No.: 15/637,805

(22) Filed: Jun. 29, 2017

(65) Prior Publication Data

US 2017/0300417 A1    Oct. 19, 2017

Related U.S. Application Data

(63) Continuation of application No. PCT/CN2015/086526, filed on Aug. 10, 2015.

(30) Foreign Application Priority Data

Dec. 31, 2014    (CN) .......................... 2014 1 0856634

(51) Int. Cl.
*G06F 12/08* (2016.01)
*G06F 12/0862* (2016.01)
(Continued)

(52) U.S. Cl.
CPC .......... *G06F 12/0862* (2013.01); *G06F 12/08* (2013.01); *G06F 12/0864* (2013.01);
(Continued)

(58) Field of Classification Search
CPC .. G06F 12/08; G06F 12/0862; G06F 12/0864; G06F 12/0875; G06F 12/0895
(Continued)

(56) References Cited

U.S. PATENT DOCUMENTS

2005/0108480 A1* 5/2005 Correale, Jr. ....... G06F 12/0846
                                                                711/128
2010/0095068 A1    4/2010 Shimizuno et al.
(Continued)

FOREIGN PATENT DOCUMENTS

CN    1450457 A    10/2003
CN    1617112 A     5/2005
(Continued)

OTHER PUBLICATIONS

Machine Translation and Abstract of Chinese Publication No. CN1450457, Oct. 22, 2003, 6 pages.
(Continued)

*Primary Examiner* — Than Nguyen
(74) *Attorney, Agent, or Firm* — Conley Rose, P.C.

(57) ABSTRACT

A multi-way set associative cache and a processing method thereof, where the cache includes M pipelines, a controller, and a data memory, where any one of the pipelines includes an arbitration circuit, a tag memory, and a determining circuit, where the arbitration circuit receives at least one lookup request at an $N^{th}$ moment, and determines a first lookup request among the at least one lookup request, the tag memory looks up locally stored tag information according to a first index address in order to acquire at least one target tag address corresponding to the first index address, the determining circuit determines whether an address that matches a first tag address exists in the at least one target tag address, and the controller sends the first lookup request to a next-level device or other pipelines for processing when the address that matches the first tag address does not exist.

20 Claims, 5 Drawing Sheets

(51) Int. Cl.
*G06F 12/0875* (2016.01)
*G06F 12/0864* (2016.01)
*G06F 12/0895* (2016.01)
*G06F 12/126* (2016.01)
*G06F 12/0855* (2016.01)

(52) U.S. Cl.
CPC ...... *G06F 12/0875* (2013.01); *G06F 12/0895* (2013.01); *G06F 12/0855* (2013.01); *G06F 12/126* (2013.01); *G06F 2212/1016* (2013.01); *G06F 2212/6022* (2013.01)

(58) Field of Classification Search
USPC .......................................................... 711/118
See application file for complete search history.

(56) References Cited

U.S. PATENT DOCUMENTS

| | | | |
|---|---|---|---|
| 2010/0100684 A1 | 4/2010 | Kurosawa et al. | |
| 2011/0320723 A1 | 12/2011 | Cohen et al. | |
| 2012/0239883 A1* | 9/2012 | Jain ................... | G06F 12/0811 711/122 |
| 2014/0244939 A1 | 8/2014 | Kwon et al. | |
| 2014/0297965 A1* | 10/2014 | Jayaseelan ......... | G06F 12/0862 711/137 |
| 2015/0193236 A1* | 7/2015 | Lin .................... | G06F 12/0862 712/207 |
| 2016/0026469 A1* | 1/2016 | Lin .................... | G06F 12/0862 712/234 |

FOREIGN PATENT DOCUMENTS

| | | |
|---|---|---|
| CN | 101681304 A | 3/2010 |
| CN | 101727406 A | 6/2010 |
| CN | 102298554 A | 12/2011 |
| CN | 104536911 A | 4/2015 |

OTHER PUBLICATIONS

Machine Translation and Abstract of Chinese Publication No. CN104536911, Apr. 22, 2015, 20 pages.
Foreign Communication From a Counterpart Application, Chinese Application No. 201410856634.7, Chinese Office Action dated Mar. 9, 2017, 8 pages.
Foreign Communication From a Counterpart Application, PCT Application No. PCT/CN2015/086526, English Translation of International Search Report dated Nov. 11, 2015, 2 pages.
Foreign Communication From a Counterpart Application, PCT Application No. PCT/CN2015/086526, English Translation of Written Opinion dated Nov. 11, 2015, 7 pages.

* cited by examiner

MULTI-WAY SET ASSOCIATIVE CACHE AND PROCESSING METHOD THEREOF

CROSS-REFERENCE TO RELATED APPLICATIONS

This application is a continuation of International Patent Application No. PCT/CN2015/086526 filed on Aug. 10, 2015, which claims priority to Chinese Patent Application No. 201410856634.7 filed on Dec. 31, 2014. The disclosures of the aforementioned applications are hereby incorporated by reference in their entireties.

TECHNICAL FIELD

The present disclosure relates to the field of computer technologies, and in particular, to a multi-way set associative cache and a processing method thereof.

BACKGROUND

In order to improve performance of a central processing unit (CPU) system, a cache structure is generally used to temporarily store recently and frequently used instructions or data. In this way, a memory is not necessarily accessed every time when an instruction is fetched or a data operation is performed, thereby reducing a delay of an operation significantly. A typical CPU system is shown in FIG. 1. A level-1 cache (L1 cache) is closest to a CPU, and its access speed is the highest, but its capacity is generally not large. A level-2 cache (L2 cache) is disposed at the periphery of the L1 cache. An access speed of the L2 cache is a little lower than that of the L1 cache, but its capacity is obviously larger. In a large multi-core CPU system, a level-3 cache (L3 cache) or even a level-4 cache (L4 cache) also exists. A generally known memory is located downstream of a last-level cache (LLC), and an access speed of the memory is much lower than those of various levels of caches, but its capacity is much larger.

Requests from the CPU are mainly classified into two types, where one is an instruction fetch operation, and the other is a data operation. The instruction fetch operation is reflected as a read operation, and the data operation is reflected as a read operation and a write operation. No matter whether the operation is a read operation or a write operation, a request caries address information. The CPU sends the request to the L1 cache first. According to the address information in the request, the L1 cache determines whether requested data exists in the L1 cache. If the requested data exists in the L1 cache, an operation is directly completed in the L1 cache, or if the requested data does not exist in the L1 cache, the L1 cache sends the request to a next-level storage (which may be a next-level cache or the memory).

There are mainly three types of cache structures, direct mapped, fully associative, and set associative. The set associative structure is the most widely applied. A typical set associative cache structure is shown in FIG. 2. Using an example in which a read request is received, a processing process is as follows. First, a set is found according to an index field in address information of the read request, where each set includes several ways, and each way may store requested data. Then, a tag field in an address information of the request is compared with tag information stored in each way, and if the tag field is consistent with the tag information, it means that a way is hit and the requested data is stored in the way, or if the tag field is not consistent with the tag information, it means that a miss occurs, this level of cache does not include the requested data, and the request needs to be sent to a next-level storage.

In the design of a large-capacity cache structure, in order to reduce power consumption, generally, the following manner is used. A tag Random-Access Memory (RAM) is looked up first to determine hit/miss, and then whether to read a data RAM is decided according to a lookup result. In order to improve a throughput, the tag RAM is generally looked up using a pipeline structure. Currently, the following manner is commonly used.

All tag RAMs are used as a pipeline, and a lookup request is received in each clock cycle. When a tag is looked up according to the lookup request, information of all ways in an index is accessed simultaneously, and after the information is read, hit/miss is determined altogether. The pipeline can receive a lookup request in each clock cycle and can work in each clock cycle. The following two problems exist in the foregoing manner when a quantity of ways of a cache increases. (1) With more Tag Rams that need to be accessed concurrently during the lookup, logical complexity of determining hit/miss is higher, which leads to low processing efficiency, and (2) because a quantity of tag RAMs that need to work simultaneously is relatively large, peak power consumption increases.

SUMMARY

The present disclosure provides a multi-way set associative cache and a processing method thereof, which solves a problem of low processing efficiency and large peak power consumption in an existing multi-way set associative cache.

According to a first aspect, a multi-way set associative cache is provided, where the cache includes M pipelines, a controller, and a data memory, where M is a positive integer greater than or equal to 2, and any one of the pipelines includes an arbitration circuit that performs pipeline processing, a tag memory, and a determining circuit, and in the any one pipeline the arbitration circuit is configured to receive at least one lookup request at an $N^{th}$ moment, and determine a first lookup request among the at least one lookup request according to a preset arbitration policy, where N is a positive integer, and the first lookup request carries a first index address and a first tag address. The tag memory is configured to look up locally stored tag information according to the first index address in order to acquire at least one target tag address corresponding to the first index address and send the at least one target tag address to the determining circuit. The determining circuit is configured to determine whether an address that matches the first tag address exists in the at least one target tag address, and the controller is configured to send the first lookup request to a next-level device or other pipelines except the any one pipeline for processing when the determining circuit determines that the address that matches the first tag address does not exist in the at least one target tag address, where tag information stored in a tag memory of each pipeline varies, the tag information stored in the tag memory of each of the M pipelines is a subset of tag information of the cache, and each piece of tag information of the cache corresponds to each memory block in the data memory in a one-to-one manner.

With reference to the first aspect, in a first possible implementation manner, the tag information of the cache is divided into at least two sets, and the tag information stored in the tag memory in each pipeline is obtained by equally dividing tag information in each set of the cache according to a total quantity M of pipelines.

With reference to the first aspect, in a second possible implementation manner, when the determining circuit determines that the address that matches the first tag address does not exist in the at least one target tag address, the controller is configured to determine whether the other pipelines have processed the first lookup request, send the first lookup request to the next-level device for processing when all the other pipelines have processed the first lookup request, and send the first lookup request at an $(N+1)^{th}$ moment to any one of the at least one pipeline that has not processed the first lookup request for processing when at least one pipeline in the other pipelines has not processed the first lookup request.

With reference to the second possible implementation manner of the first aspect, in a third possible implementation manner, that the controller determines whether the other pipelines have processed the first lookup request includes detecting whether the first lookup request carries indication information, where the indication information includes a quantity of times the first lookup request has been processed, and/or identification information of a pipeline that has processed the first lookup request, and determining that all the other pipelines have processed the first lookup request when the first lookup request carries the indication information and the indication information indicates that the first lookup request has been processed M−1 times, determining that the at least one pipeline that has not processed the first lookup request exists in the other pipelines when the first lookup request carries the indication information and the indication information indicates that the quantity of times the first lookup request has been processed is less than M−1, or determining that the other pipelines have not processed the first lookup request when the first lookup request does not carry the indication information.

With reference to the third possible implementation manner of the first aspect, in a fourth possible implementation manner, when the indication information indicates that the quantity of times the first lookup request has been processed is less than M−1, and when the first lookup request is sent to the other pipelines for processing, the controller is further configured to update the quantity of times the first lookup request has been processed in the indication information, and/or update identification information of the any one pipeline into the indication information.

With reference to the third possible implementation manner of the first aspect, in a fifth possible implementation manner, when the first lookup request does not carry the indication information, the controller is further configured to set the first lookup request to carry indication information when the first lookup request is sent to the other pipelines for processing, where the indication information is used to indicate that the first lookup request is processed for the first time, and/or indicate identification information of the any one pipeline that has processed the first lookup request.

With reference to the first aspect or any one of the first to fifth possible implementation manners of the first aspect, in a sixth possible implementation manner, the controller is further configured to read data according to the first target address from a memory block that corresponds to the first target address and is in the data memory when the determining circuit determines that a first target address that matches the first tag address exists in the at least one target tag address.

With reference to the first aspect or any one of the first to sixth possible implementation manners of the first aspect, in a seventh possible implementation manner, when M is equal to 2, the preset arbitration policy includes setting the lookup request from the upstream device as the first lookup request when the at least one lookup request includes only a lookup request sent by an upstream device, setting the received lookup request as the first lookup request when the at least one lookup request includes only lookup requests sent by the other pipelines, or setting the lookup requests from the other pipelines as the first lookup request, and temporarily storing the lookup request from the upstream device when the at least one lookup request includes a lookup request sent by an upstream device and lookup requests sent by the other pipelines.

With reference to the first aspect or any one of the first to sixth possible implementation manners of the first aspect, in an eighth possible implementation manner, when M is greater than 2, the preset arbitration policy includes setting a lookup request from a pipeline of a highest priority in the other pipelines as the first lookup request according to preset priorities of the pipelines, and temporarily storing a remaining lookup request when the at least one lookup request includes only at least two lookup requests sent by the other pipelines, or setting a lookup request from a pipeline of a highest priority in the other pipelines as the first lookup request, and temporarily storing the lookup request sent by the upstream device and a lookup request sent by a pipeline other than the pipeline of the highest priority in the other pipelines when the at least one lookup request includes a lookup request sent by an upstream device and at least two lookup requests sent by the other pipelines.

With reference to the seventh possible implementation manner of the first aspect or the eighth possible implementation manner of the first aspect, in a ninth possible implementation manner, the preset arbitration policy further includes setting the lookup request from the pipeline of the highest priority and is in the at least one lookup request as the first lookup request, and temporarily storing a lookup request other than the first lookup request in the at least one lookup request when the at least one lookup request further includes a temporarily stored lookup request, where priorities of the other pipelines are higher than a priority of the upstream device.

With reference to the first aspect or any one of the first to ninth possible implementation manners of the first aspect, in a tenth possible implementation manner, the cache further includes an enable circuit configured to determine, at the $N^{th}$ moment, the any one pipeline that is used to process the at least one lookup request and is in the M pipelines, and enable the any one pipeline to trigger the arbitration circuit in the any one pipeline to receive the at least one lookup request.

According to a second aspect, a processing method for a multi-way set associative cache is provided, where the cache includes M pipelines, M is a positive integer greater than or equal to 2, and a processing method for any one pipeline includes receiving at least one lookup request at an $N^{th}$ moment, and determining a first lookup request among the at least one lookup request according to a preset arbitration policy, where N is a positive integer, and the first lookup request carries a first index address and a first tag address, looking up locally stored tag information according to the first index address in order to acquire at least one target tag address corresponding to the first index address, and sending the first lookup request to a next-level device or other pipelines except the any one pipeline for processing when an address that matches the first tag address does not exist in the at least one target tag address, where tag information stored in each of the M pipelines is a subset of tag information of the cache, and each piece of tag information of the cache corresponds to each memory block in a data memory in the cache in a one-to-one manner.

With reference to the second aspect, in a first possible implementation manner, the tag information of the cache is divided into at least two sets, and the tag information stored in each pipeline is obtained by equally dividing tag information in each set of the cache according to a total quantity M of pipelines.

With reference to the second aspect, in a second possible implementation manner, sending the first lookup request to a next-level device or other pipelines except the any one pipeline for processing includes determining whether the other pipelines have processed the first lookup request, sending the first lookup request to the next-level device for processing when all the other pipelines have processed the first lookup request, and sending the first lookup request at an $(N+1)^{th}$ moment to any one of the at least one pipeline that has not processed the first lookup request when at least one pipeline in the other pipelines has not processed the first lookup request.

With reference to the second possible implementation manner of the second aspect, in a third possible implementation manner, determining whether the other pipelines have processed the first lookup request includes detecting whether the first lookup request carries indication information, where the indication information includes a quantity of times the first lookup request has been processed, and/or identification information of a pipeline that has processed the first lookup request, and determining that all the other pipelines have processed the first lookup request when the first lookup request carries the indication information and the indication information indicates that the first lookup request has been processed M−1 times, determining that the at least one pipeline that has not processed the first lookup request exists in the other pipelines when the first lookup request carries the indication information and the indication information indicates that the quantity of times the first lookup request has been processed is less than M−1, or determining that the other pipelines have not processed the first lookup request when the first lookup request does not carry the indication information.

With reference to the third possible implementation manner of the second aspect, in a fourth possible implementation manner, when the indication information indicates that the quantity of times the first lookup request has been processed is less than M−1, and when the first lookup request is sent to the other pipelines for processing, the method further includes updating the quantity of times the first lookup request has been processed in the indication information, and/or updating identification information of the any one pipeline into the indication information.

With reference to the third possible implementation manner of the second aspect, in a fifth possible implementation manner, when the first lookup request does not carry the indication information, the method further includes setting the first lookup request to carry indication information when the first lookup request is sent to the other pipelines for processing, where the indication information is used to indicate that the first lookup request is processed for the first time, and/or indicate identification information of the any one pipeline that has processed the first lookup request.

With reference to the second aspect or any one of the first to fifth possible implementation manners of the second aspect, in a sixth possible implementation manner, when a first target address that matches the first tag address exists in the at least one target tag address, the method further includes reading data according to the first target address from a memory block that corresponds to the first target address and is in the data memory.

With reference to the second aspect or any one of the first to sixth possible implementation manners of the second aspect, in a seventh possible implementation manner, when M is equal to 2, the preset arbitration policy includes setting the lookup request from the upstream device as the first lookup request when the at least one lookup request includes only a lookup request sent by an upstream device, setting the received lookup request as the first lookup request when the at least one lookup request includes only lookup requests sent by the other pipelines, or setting the lookup requests from the other pipelines as the first lookup request, and temporarily storing the lookup request sent by the upstream device when the at least one lookup request includes a lookup request sent by an upstream device and lookup requests sent by the other pipelines.

With reference to the second aspect or any one of the first to sixth possible implementation manners of the second aspect, in an eighth possible implementation manner, when M is greater than 2, the preset arbitration policy includes setting a lookup request from a pipeline of a highest priority in the other pipelines as the first lookup request according to preset priorities of the pipelines, and temporarily storing a remaining lookup request when the at least one lookup request includes only at least two lookup requests sent by the other pipelines, or setting a lookup request from a pipeline of a highest priority in the other pipelines as the first lookup request, and temporarily storing the lookup request sent by the upstream device and a lookup request sent by a pipeline other than the pipeline of the highest priority in the other pipelines when the at least one lookup request includes a lookup request sent by an upstream device and at least two lookup requests sent by the other pipelines.

With reference to the seventh possible implementation manner of the second aspect or the eighth possible implementation manner of the second aspect, in a ninth possible implementation manner, the preset arbitration policy further includes setting the lookup request from the pipeline of the highest priority and is in the at least one lookup request as the first lookup request, and temporarily storing a lookup request other than the first lookup request in the at least one lookup request when the at least one lookup request further includes a temporarily stored lookup request, where priorities of the other pipelines are higher than a priority of the upstream device.

With reference to the second aspect or any one of the first to ninth possible implementation manners of the second aspect, in a tenth possible implementation manner, the method further includes determining, at the $N^{th}$ moment, the any one pipeline that is used to process the at least one lookup request and is in the M pipelines, and enabling the any one pipeline to trigger the arbitration circuit in the any one pipeline to receive the at least one lookup request.

According to the multi-way set associative cache and the processing method thereof provided in the present disclosure, the cache includes M pipelines, where M is a positive integer greater than or equal to 2. Because only one pipeline processes a received lookup request at an $N^{th}$ moment, system power consumption is reduced. In addition, tag information stored in a tag memory of each pipeline varies, the tag information stored in the tag memory of each of the M pipelines is a subset of tag information of the cache, and each piece of tag information of the cache corresponds to each memory block in a data memory in a one-to-one manner. Because the tag memory of each pipeline stores the tag information stored in the cache to which the pipeline belongs, concurrent lookup is implemented on the pipelines, thereby reducing lookup time and improving a system throughput.

DESCRIPTION OF EMBODIMENTS

A cache provided in an embodiment of the present disclosure includes M pipelines, where M is a positive integer greater than or equal to 2. Because only one pipeline processes a received lookup request at an $N^{th}$ moment, system power consumption is reduced. In this embodiment of the present disclosure, tag information stored in a tag memory of each pipeline varies, the tag information stored in the tag memory of each of the M pipelines is a subset of tag information of the cache, and each piece of tag information of the cache corresponds to each memory block in a data memory in a one-to-one manner. Because the tag memory of each pipeline stores the tag information stored in the cache to which the pipeline belongs, concurrent lookup is implemented on the pipelines, thereby reducing lookup time and improving a system throughput.

The following describes the embodiments of the present disclosure in further detail with reference to the accompanying drawings and the specification. It should be understood that the embodiments described herein are merely used to explain the present disclosure but are not intended to limit the present disclosure.

Figure 1:
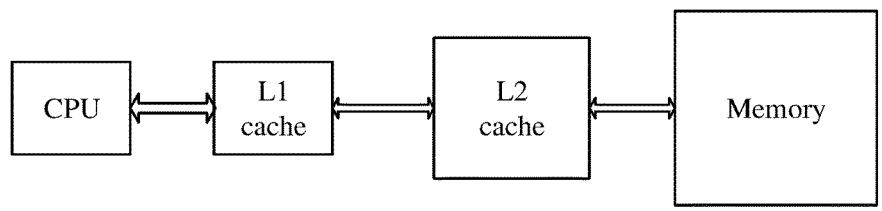
FIG. 1 is a schematic structural diagram of a CPU system.
Figure 2:
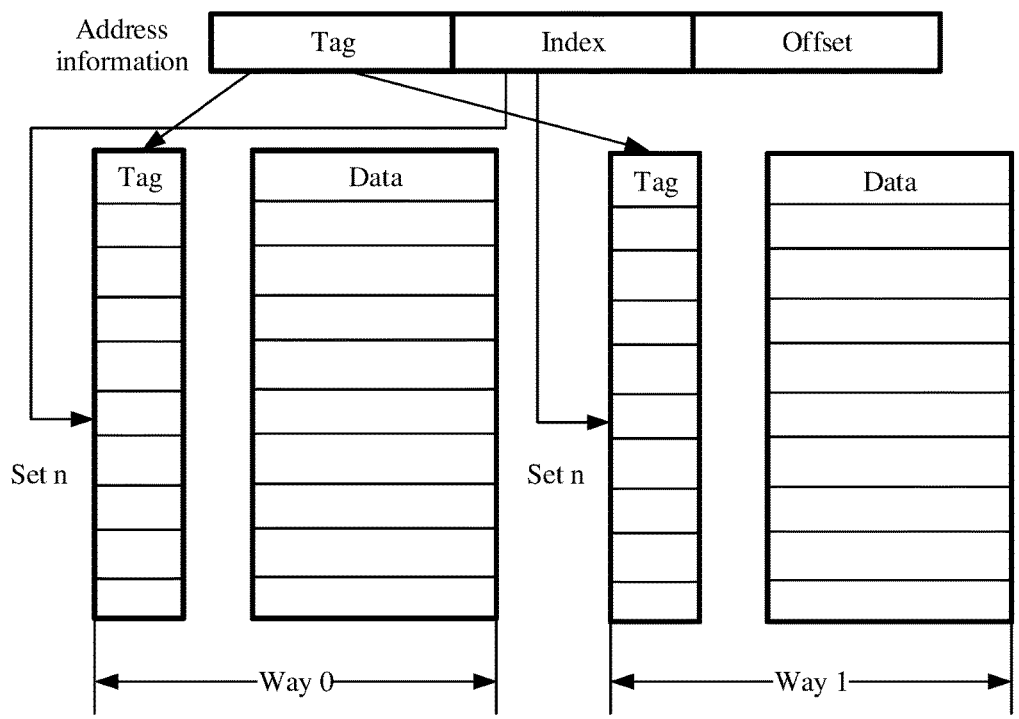
FIG. 2 is a schematic structural diagram of an existing cache that has a set associative structure.
Figure 3:
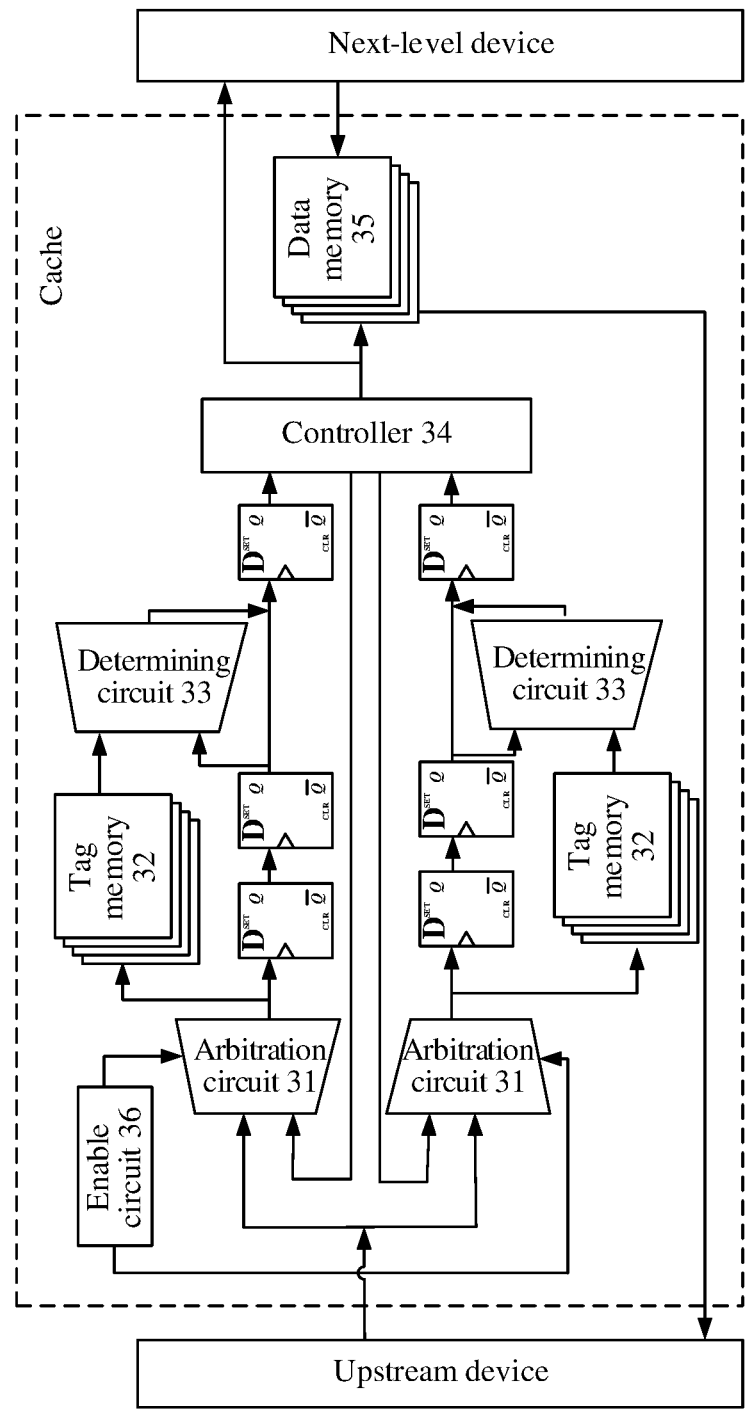
FIG. 3 is a schematic diagram of a multi-way set associative cache according to the present disclosure.

As shown in FIG. 3, a multi-way set associative cache provided in an embodiment of the present disclosure includes M pipelines, a controller 34, and a data memory 35, where M is a positive integer greater than or equal to 2, and any one of the pipelines includes an arbitration circuit 31 that performs pipeline processing, a tag memory 32, and a determining circuit 33.

Further, in the any one pipeline the arbitration circuit 31 is configured to receive at least one lookup request at an $N^{th}$ moment, and determine a first lookup request among the at least one lookup request according to a preset arbitration policy, where N is a positive integer, and the first lookup request carries a first index address and a first tag address.

The tag memory 32 is configured to look up locally stored tag information according to the first index address in order to acquire at least one target tag address corresponding to the first index address and send the at least one target tag address to the determining circuit 33.

The determining circuit 33 is configured to determine whether an address that matches the first tag address exists in the at least one target tag address.

The controller 34 is configured to send the first lookup request to a next-level device or other pipelines except the any one pipeline for processing when the determining circuit 33 determines that the address that matches the first tag address does not exist in the at least one target tag address.

Tag information stored in the tag memory 32 of each pipeline varies, the tag information stored in the tag memory 32 of each of the M pipelines is a subset of tag information of the cache, and each piece of tag information of the cache corresponds to each memory block in the data memory 35 in a one-to-one manner.

In this embodiment of the present disclosure, a processing process of any one pipeline in the M pipelines is used as an example for description, and processing processes of other pipelines are similar and are not repeated herein.

In this embodiment of the present disclosure, the at least one lookup request is a read/write operation.

The cache provided in this embodiment of the present disclosure includes M pipelines, a controller 34, and a data memory 35, where M is a positive integer greater than or equal to 2. Because only one pipeline processes a received lookup request at an $N^{th}$ moment, system power consumption is reduced. In this embodiment of the present disclosure, tag information stored in a tag memory 32 of each pipeline varies, the tag information stored in the tag memory 32 of each of the M pipelines is a subset of tag information of the cache, and each piece of tag information of the cache corresponds to each memory block in a data memory 35 in a one-to-one manner. Because the tag memory 32 of each pipeline stores the tag information stored in the cache to which the pipeline belongs, concurrent lookup is implemented on the pipelines, thereby reducing lookup time and improving a system throughput.

It should be noted that at the $N^{th}$ moment, only one pipeline can read a lookup request, and the tag memory 32 of each pipeline performs read processing at a rising edge or a falling edge of a clock cycle in which the pipeline can read the lookup request. However, each pipeline may read the lookup request or may not read the lookup request in the clock cycle in which the pipeline can read the lookup request. If a lookup request being processed exists in the tag memory 32 at the $N^{th}$ moment, the lookup request being processed may be transmitted from a current processing stage to a next processing stage at the $N^{th}$ moment.

In each pipeline, processing performed for a lookup request includes the following processing stages successively. a RAM input stage, a RAM access stage, a RAM output stage, a hit/miss determining stage, and the like. In implementation, a proper adjustment may be made according to a specific situation. For example, when a temporal sequence is not tight, any two consecutive stages may be combined into one stage. For another example, when a temporal sequence is tight, any one stage may be split into multiple stages.

In order to further reduce power consumption, only when a lookup request comes into an ingress of an arbitration circuit of each pipeline or a lookup request is being processed in a tag memory 32 of the pipeline, the arbitration circuit 31 of the pipeline performs arbitration processing.

In this embodiment of the present disclosure, the tag memories 32 in the pipelines may include a same quantity of tag information or different quantities of tag information. In a preferred implementation manner, the tag information of the cache is divided into at least two sets, and the tag information stored in the tag memory 32 in each pipeline is obtained by equally dividing tag information in each set of the cache according to a total quantity M of pipelines.

Figure 4:
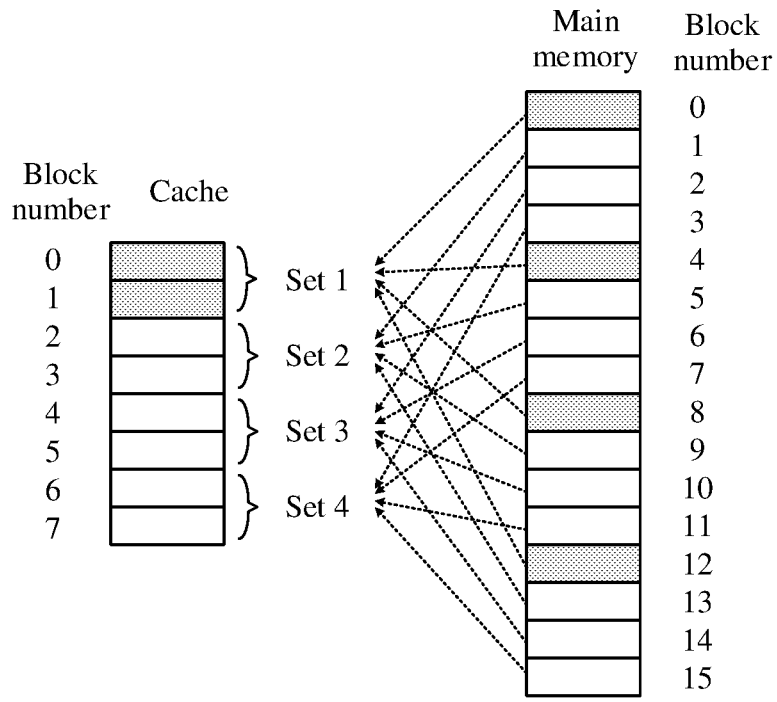
FIG. 4 is a schematic diagram of a mapping relationship between each set in an existing cache and a memory block of a main memory.

An existing set associative cache architecture is shown in FIG. 4. The architecture uses several sets of direct mapped blocks, and a mapping relationship exists between each set and a memory block of a main memory. A part of data in the main memory may be placed in any location in a set of the cache according to the mapping relationship between each set of the cache and the memory block of the main memory. For example, memory blocks 0, 4, 8, and 12 in the main memory are corresponding to a set 1 in the cache, and therefore, data included in these blocks in the main memory may be placed in any location in the set 1 of the cache. A CPU accesses the cache by searching a directory table. That is, a directory table is set in the cache. A quantity of entries included in the table is the same as a quantity of blocks of the cache. Each entry corresponds to one block in the cache. When a block of the main memory is fetched in a location of a block in the cache, an entry corresponding to the block of the cache in the directory table is filled with an identifier of the block of the main memory, and a significant bit of the entry is set to "1".

Figure 5:
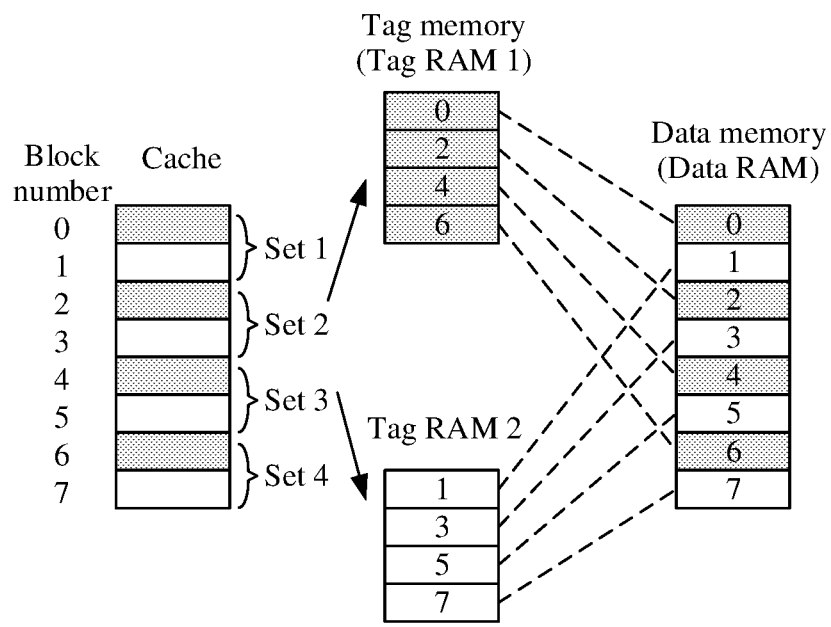
FIG. 5 is a schematic diagram of a mapping relationship between a tag memory of each pipeline of a cache and a memory block of a main memory according to the present disclosure.

In the set associative cache architecture in this embodiment of the present disclosure, at least two pipelines are included. Each pipeline includes a tag memory (tag RAM), and tag information stored in the tag memory of each pipeline is a subset of tag information stored in the cache. Using an example in which the cache includes two pipelines, as shown in FIG. 5, the tag information stored in the cache is divided into multiple sets, and then tag information in the multiple sets is equally divided to obtain two subsets. The tag memory of each pipeline corresponds to one subset. That is, a Tag RAM 1 includes a block 0 in a set 1, a block 2 in a set 2, a block 4 in a set 3, and a block 6 in a set 4, and a Tag RAM 2 includes a block 1 in the set 1, a block 3 in the set 2, a block 5 in the set 3, and a block 7 in the set 4. Tag information stored in the two Tag RAMs is a universal set of the tag information stored in the cache. When lookup is performed, a set (way) may be determined first according to index field information in a lookup request. After the set is determined, tag information in a lookup address is compared with tag information in a determined set to check whether they match. Data is read from a data memory (Data RAM) according to the lookup address if they match, or the lookup request is sent to other pipelines for lookup processing if they do not match. If a lookup result of each pipeline is miss, it indicates that the data required by the lookup request does not exist in the cache, and the lookup request is sent to a next-level device for processing. Because the tag memory of each pipeline stores the tag information stored in the cache to which the pipeline belongs, concurrent lookup is implemented on the pipelines, thereby reducing lookup time and improving a system throughput.

In implementation, the controller 34 shown in FIG. 3, is further configured to read data according to the first target address from a memory block corresponding to the first target address and is in the data memory 35 when the determining circuit 33 determines that a first target address that matches the first tag address exists in the at least one target tag address.

In implementation, when the determining circuit 33 determines that the address that matches the first tag address does not exist in the at least one target tag address, the controller 34 is configured to determine whether the other pipelines have processed the first lookup request, send the first lookup request to the next-level device for processing if all the other pipelines have processed the first lookup request, and send the first lookup request at an $(N+1)^{th}$ moment to any one of the at least one pipeline that has not processed the first lookup request for processing if at least one pipeline in the other pipelines has not processed the first lookup request.

Further, if at least one pipeline in the other pipelines has not processed the first lookup request, the controller 34 may send, according to preset priorities, the first lookup request at the $(N+1)^{th}$ moment to a pipeline of a highest priority in the at least one pipeline for processing, or the controller 34 may send, according to number information of the at least one pipeline, the first lookup request at the $(N+1)^{th}$ moment to a pipeline with a smallest (or greatest) number in the at least one pipeline for processing. Certainly, the controller 34 may send, in another manner, the first lookup request to any pipeline in the at least one pipeline for processing, which is not limited in this embodiment of the present disclosure.

In implementation, that the controller 34 determines whether the other pipelines have processed the first lookup request includes detecting whether the first lookup request carries indication information, where the indication information includes a quantity of times the first lookup request has been processed, and/or identification information of a pipeline that has processed the first lookup request, and determining that all the other pipelines have processed the first lookup request if the first lookup request carries the indication information and the indication information indicates that the first lookup request has been processed M−1 times, determining that the at least one pipeline that has not processed the first lookup request exists in the other pipelines if the first lookup request carries the indication information and the indication information indicates that the quantity of times the first lookup request has been processed is less than M−1, or determining that the other pipelines have not processed the first lookup request if the first lookup request does not carry the indication information.

Further, if the cache includes only two pipelines, specific implementation of the indication information includes the following three manners. The quantity of times the first lookup request has been processed, the identification information of the pipeline that has processed the first lookup request, and a combination of the quantity of times the first lookup request has been processed and the identification information of the pipeline that has processed the first lookup request.

If the cache includes more than two pipelines, specific implementation of the indication information includes the following two manners. The identification information of the pipeline that has processed the first lookup request, and a combination of the quantity of times the first lookup request has been processed and the identification information of the pipeline that has processed the first lookup request.

In implementation, if the indication information indicates that the quantity of times the first lookup request has been processed is less than M−1, and when the first lookup request is sent to the other pipelines for processing, the controller 34 is further configured to update the quantity of times the first lookup request has been processed in the indication information, and/or update identification information of the any one pipeline into the indication information.

Further, because the any one pipeline has processed the first lookup request, the controller 34 further needs to update content of the indication information of the first lookup request. Further, the controller 34 adds 1 to the quantity of times the first lookup request has been processed if the indication information includes the quantity of times the first lookup request has been processed, and the controller 34 adds the identification information of the any one pipeline into the indication information if the indication information includes the identification information of the any one pipeline that has processed the first lookup request.

In implementation, if the first lookup request does not carry the indication information, the controller 34 is further configured to set the first lookup request to carry indication information when the first lookup request is sent to the other pipelines for processing, where the indication information is used to indicate that the first lookup request is processed for the first time, and/or indicate identification information of the any one pipeline that has processed the first lookup request.

Further, if the first lookup request does not carry the indication information, it indicates that the first lookup request is processed for the first time (for example, the first lookup request comes from an upstream device).

In this case, when the first lookup request is sent to the other pipelines for processing, the controller 34 needs to add the indication information into the first lookup request.

Based on any embodiment described above, if M is equal to 2 (namely, the cache includes two pipelines), the preset arbitration policy includes the following three processing manners.

Manner 1: The lookup request from the upstream device is used as the first lookup request when the at least one lookup request includes only a lookup request from an upstream device.

In this manner, the at least one lookup request includes only the lookup request that comes from the upstream device, and in this case, the lookup request needs to be processed as the first lookup request.

Manner 2: When the at least one lookup request includes only lookup requests sent by the other pipelines, the received lookup request is used as the first lookup request.

In this manner, the at least one lookup request includes only the lookup request that come from the other pipelines, and in this case, the lookup request that come from the other pipelines needs to be processed as the first lookup request.

Manner 3: When the at least one lookup request includes a lookup request sent by an upstream device and lookup requests sent by the other pipelines, the lookup requests sent by the other pipelines are used as the first lookup request, and the lookup request sent by the upstream device is temporarily stored.

In this manner, for the lookup request sent by the upstream device and the lookup requests sent by the other pipelines, priorities of the lookup requests sent by the other pipelines are higher than a priority of the lookup request sent by the upstream device. Therefore, the lookup requests sent by the other pipelines are processed first, and the lookup request sent by the upstream device is temporarily stored.

In this manner, for a temporarily stored lookup request, the controller 34 may read the temporarily stored lookup request at an $(N+M)^{th}$ moment, and set the temporarily stored lookup request as the first lookup request.

Based on any embodiment described above, if M is greater than 2 (namely, the cache includes three or more pipelines), the preset arbitration policy includes the following two processing manners.

Manner 1: A lookup request from a pipeline of a highest priority in the other pipelines is used as the first lookup request according to preset priorities of the pipelines, and a remaining lookup request is temporarily stored when the at least one lookup request includes only at least two lookup requests from the other pipelines.

In this manner, the preset priorities of the pipelines may be set sequentially according to numbers of the pipelines. For example, a smaller number of a pipeline indicates a higher priority, and for another example, a larger number of a pipeline indicates a higher priority. A rule for setting a priority of each pipeline is not limited in this embodiment of the present disclosure.

In this manner, for temporarily stored lookup requests, the controller 34 may read the temporarily stored lookup requests one by one at an $(N+i \times M)^{th}$ moment according to priorities corresponding to the temporarily stored lookup requests, and set a read lookup request as the first lookup request, where i is a natural number.

Manner 2: When the at least one lookup request includes a lookup request sent by an upstream device and at least two lookup requests sent by the other pipelines, a lookup request sent by a pipeline of a highest priority in the other pipelines is used as the first lookup request, and the lookup request sent by the upstream device and a lookup request sent by a pipeline other than the pipeline of the highest priority in the other pipelines are temporarily stored.

In this manner, priorities of the lookup requests sent by the other pipelines are higher than a priority of the lookup request sent by the upstream device. In the lookup requests sent by the other pipelines, a higher priority of a pipeline indicates a higher priority of a lookup request sent by the pipeline.

In this manner, for temporarily stored lookup requests, the controller 34 may read the temporarily stored lookup requests one by one at an $(N+i \times M)^{th}$ moment according to priorities corresponding to the temporarily stored lookup requests, and set a read lookup request as the first lookup request, where i is a natural number.

Based on any manner described above, the preset arbitration policy further includes setting the lookup request from the pipeline of the highest priority and is in the at least one lookup request as the first lookup request, and temporarily storing a lookup request other than the first lookup request in the at least one lookup request when the at least one lookup request further includes a temporarily stored lookup request, where priorities of the other pipelines are higher than a priority of the upstream device.

Based on any embodiment described above, the cache further includes an enable circuit 36 configured to determine, at the $N^{th}$ moment, the any one pipeline that is used to process the at least one lookup request and is in the M pipelines, and enable the any one pipeline to trigger the arbitration circuit 31 in the any one pipeline to receive the at least one lookup request.

In this embodiment of the present disclosure, the upstream device is a processor connected to the cache, or a previous-level cache connected to the cache.

In this embodiment of the present disclosure, the next-level device is a main memory connected to the cache, or a next-level cache connected to the cache.

Using an example in which a cache includes two pipelines (a Pipeline 0 and a Pipeline 1), the following describes a processing process of a multi-way set associative cache provided in an embodiment of the present disclosure.

Embodiment 1: In this embodiment, there is one pipeline and only one pipeline in each clock cycle that can read a received lookup request. The specific process is as follows.

Figure 6:
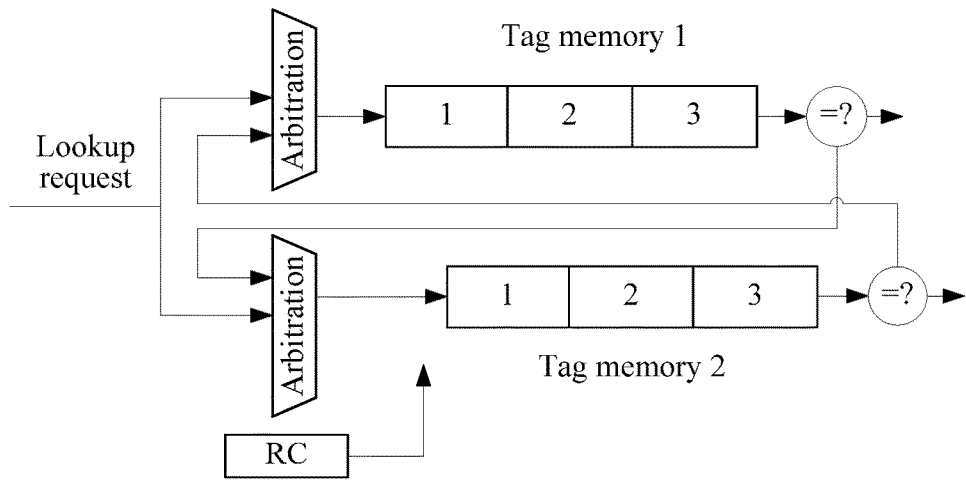
FIG. 6 is a schematic diagram of Embodiment 1 according to the present disclosure.

Step 1: All tag information in the cache is divided into two subsets, which are respectively stored in tag memories of the two pipelines (a tag memory of the Pipeline 0 is marked as a tag memory 1, and a tag memory of the Pipeline 1 is marked as a tag memory 2), as shown in FIG. 6.

Step 2: A ring counter (RC), that is shown in FIG. 6, with a bit width of 1 bit, namely, an enable circuit, is set. After being reset, the RC starts to count cyclically by alternating 0 with 1. A count value 0 of the RC represents that the Pipeline 0 can work (namely, the Pipeline 0 can read a received lookup request), and in this case, the RC may trigger an arbitration circuit in the Pipeline 0 to receive the lookup request, and a count value 1 of the RC represents that the Pipeline 1 can work (namely, the Pipeline 1 can read a received lookup request), and in this case, the RC may trigger an arbitration circuit in the Pipeline 1 to receive the lookup request.

It should be noted that a count value of the RC represents a pipeline that can work currently, but the pipeline does not necessarily work. In order to further reduce power consumption, the pipeline works only when a lookup request comes into an ingress of an arbitration circuit of the pipeline or a lookup request is being processed in a tag memory of the pipeline.

Step 3: An arbitration circuit in each pipeline can receive both a lookup request of an upstream device and a lookup request sent by the other pipeline. An arbitration policy of the arbitration circuit that the lookup request is processed directly when only one way has a lookup request, and when two ways have lookup requests simultaneously, the lookup request of the upstream device is temporarily stored, and the lookup request sent by the other pipeline is processed first.

Figure 7:
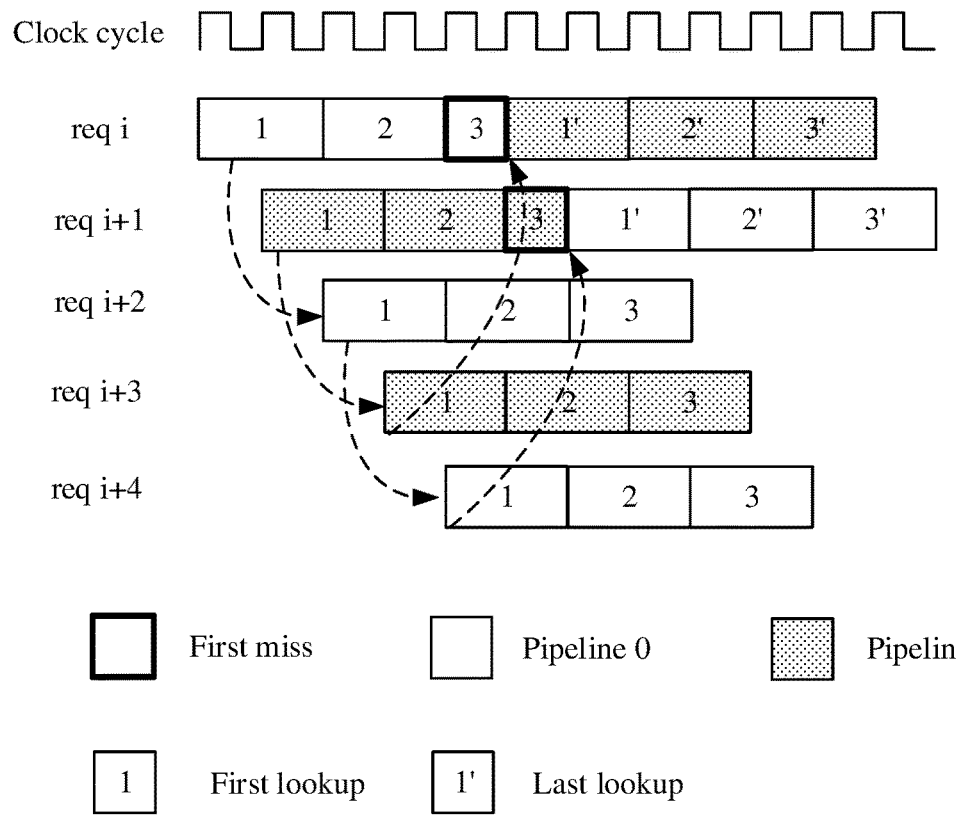
FIG. 7 is a processing sequence diagram of Embodiment 1 according to the present disclosure.

Step 4: After a determining circuit in a pipeline that processes the lookup request for the first time obtains a lookup result, a controller selects a subsequent processing process according to the lookup result of the determining circuit. If the cache is hit, a read/write operation may be performed in a data memory of the cache according to address information of the lookup request, or if the cache is missed, the lookup request is sent at an $(N+1)^{th}$ moment to the other pipeline for processing. FIG. 7 is a processing sequence diagram.

In FIG. 7, at a moment when a first clock pulse arrives, a lookup request i (req i) enters a first pipeline (the Pipeline 0) for processing, and if a lookup result of a determining circuit in the Pipeline 0 is miss, the lookup request i is sent to a second pipeline (the Pipeline 1) for processing. At a moment when a second clock pulse arrives, a lookup request i+1 (req i+1) enters the Pipeline 1 for processing, and if a lookup result of a determining circuit in the Pipeline 1 is miss, the lookup request i+1 is sent to the Pipeline 0 for processing. At a moment when a third clock pulse arrives, a lookup request i+2 (req i+2) enters the Pipeline 0 for processing. At a moment when a fourth clock pulse arrives, a lookup request i+3 (req i+3) enters the Pipeline 1 for processing, and at the moment when the fifth clock pulse arrives, a lookup request i+4 (req i+4) enters the Pipeline 0 for processing. It should be noted that a numeral 1, 2, or 3 in each box in FIG. 7 represents each stage in the processing process.

Figure 8:
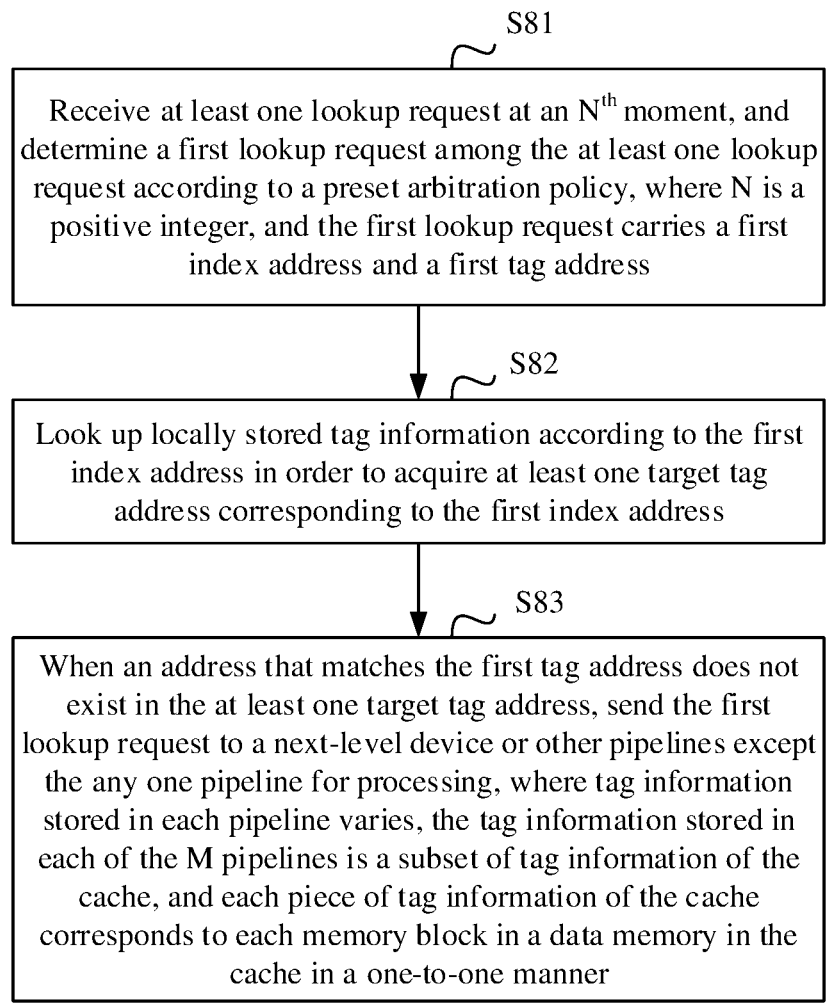
FIG. 8 is a schematic diagram of a processing method for a multi-way set associative cache according to the present disclosure.

Based on a same disclosure conception, an embodiment of the present disclosure further provides a processing method for a multi-way set associative cache, where the cache includes M pipelines, and M is a positive integer greater than or equal to 2. As shown in FIG. 8, a processing method for any one pipeline includes the following steps.

Step S81: Receive at least one lookup request at an $N^{th}$ moment, and determine a first lookup request among the at least one lookup request according to a preset arbitration policy, where N is a positive integer, and the first lookup request carries a first index address and a first tag address.

Step S82: Look up locally stored tag information according to the first index address in order to acquire at least one target tag address corresponding to the first index address.

Step S83: When an address that matches the first tag address does not exist in the at least one target tag address, send the first lookup request to a next-level device or other pipelines except the any one pipeline for processing, where tag information stored in each pipeline varies, the tag information stored in each of the M pipelines is a subset of tag information of the cache, and each piece of tag information of the cache corresponds to each memory block in a data memory in the cache in a one-to-one manner.

In a preferred implementation manner, the tag information of the cache is divided into at least two sets, and the tag information stored in each pipeline is obtained by equally dividing tag information in each set of the cache according to a total quantity M of pipelines.

In implementation, in step S83, sending the first lookup request to a next-level device or other pipelines except the any one pipeline for processing includes determining whether the other pipelines have processed the first lookup request. Sending the first lookup request to the next-level device for processing if all the other pipelines have processed the first lookup request, and sending the first lookup request at an $(N+1)^{th}$ moment to any one of the at least one pipeline that has not processed the first lookup request if at least one pipeline in the other pipelines has not processed the first lookup request.

Further, determining whether the other pipelines have processed the first lookup request includes detecting whether the first lookup request carries indication information, where the indication information includes a quantity of times the first lookup request has been processed, and/or identification information of a pipeline that has processed the first lookup request, and determining that all the other pipelines have processed the first lookup request if the first lookup request carries the indication information and the indication information indicates that the first lookup request has been processed M−1 times, determining that the at least one pipeline that has not processed the first lookup request exists in the other pipelines if the first lookup request carries the indication information and the indication information indicates that the quantity of times the first lookup request has been processed is less than M−1, or determining that the other pipelines have not processed the first lookup request if the first lookup request does not carry the indication information.

In implementation, if the indication information indicates that the quantity of times the first lookup request has been processed is less than M−1, and when the first lookup request is sent to the other pipelines for processing, the method further includes updating the quantity of times the first lookup request has been processed in the indication information, and/or updating identification information of the any one pipeline into the indication information.

In implementation, if the first lookup request does not carry the indication information, and when the first lookup request is sent to the other pipelines for processing, the method further includes setting the first lookup request to carry indication information, where the indication information is used to indicate that the first lookup request is processed for the first time, and/or indicate identification information of the any one pipeline that has processed the first lookup request.

Based on any embodiment described above, the method further includes reading data according to the first target address from a memory block corresponding to the first target address and is in the data memory when a first target address that matches the first tag address exists in the at least one target tag address.

Based on any embodiment described above, if M is equal to 2, the preset arbitration policy includes setting the lookup request from the upstream device as the first lookup request when the at least one lookup request includes only a lookup request from an upstream device, setting the received lookup request as the first lookup request when the at least one lookup request includes only lookup requests from the other pipelines, or setting the lookup requests from the other pipelines as the first lookup request, and temporarily storing the lookup request from the upstream device when the at least one lookup request includes a lookup request from an upstream device and lookup requests from the other pipelines.

Based on any embodiment described above, if M is greater than 2, the preset arbitration policy includes setting a lookup request from a pipeline of a highest priority in the other pipelines as the first lookup request according to preset priorities of the pipelines, and temporarily storing a remaining lookup request when the at least one lookup request includes only at least two lookup requests from the other pipelines, or setting a lookup request from a pipeline of a highest priority in the other pipelines as the first lookup request, and temporarily storing the lookup request from the upstream device and a lookup request from a pipeline other than the pipeline of the highest priority in the other pipelines when the at least one lookup request includes a lookup request from an upstream device and at least two lookup requests from the other pipelines.

The preset arbitration policy further includes setting the lookup request from the pipeline of the highest priority and is in the at least one lookup request as the first lookup request, and temporarily storing a lookup request other than the first lookup request in the at least one lookup request when the at least one lookup request further includes a temporarily stored lookup request, where priorities of the other pipelines are higher than a priority of the upstream device.

Based on any embodiment described above, the method further includes determining, at the $N^{th}$ moment, the any one pipeline that is used to process the at least one lookup request and is in the M pipelines, and enabling the any one pipeline to trigger the arbitration circuit in the any one pipeline to receive the at least one lookup request.

The foregoing method processing process may be implemented using a software program, where the software program may be stored in a storage medium. The stored software program executes the foregoing method steps when being invoked.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disc read-only memory (CD-ROM), an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or any other programmable data processing device such that a series of operations and steps are performed on the computer or the any other programmable device in order to generate computer-implemented processing. Therefore, the instructions executed on the computer or the any other programmable device provide steps for implementing a specific function in one or more processes in the flowcharts and/or in one or more blocks in the block diagrams.

Although exemplary embodiments of the present disclosure have been described, persons skilled in the art may make changes and modifications to these embodiments once they learn the basic inventive concept. Therefore, the following claims are intended to be construed as to cover the exemplary embodiments and all changes and modifications falling within the scope of the present disclosure.

Obviously, persons skilled in the art may make various modifications and variations to the present disclosure without departing from the spirit and scope of the present disclosure. The present disclosure is intended to cover these modifications and variations provided that they fall within the protection scope defined by the following claims and their equivalent technologies.

What is claimed is:

1. A multi-way set associative cache, comprising:
M pipelines;
a controller coupled to the M pipelines; and
a data memory coupled to the controller,
wherein M is a positive integer greater than or equal to 2,
wherein each one of the M pipelines comprises:
  an arbitration circuit configured to perform pipeline processing;
  a tag memory coupled to the arbitration circuit; and
  a determining circuit coupled to the tag memory,
wherein in each one of the M pipelines the arbitration circuit is configured to:
  receive at least one lookup request at an $N^{th}$ moment; and
  determine a first lookup request among the at least one lookup request according to a preset arbitration policy,
wherein N is a positive integer,
wherein the first lookup request carries a first index address and a first tag address, wherein the tag memory is configured to:
look up locally stored tag information according to the first index address in order to acquire at least one target tag address corresponding to the first index address; and
send the at least one target tag address to the determining circuit,
wherein the determining circuit is configured to determine whether an address matching the first tag address exists in the at least one target tag address,
wherein the controller is configured to send the first lookup request to a next-level device or another pipeline except the any one pipeline for processing when the address matching the first tag address does not exist in the at least one target tag address,
wherein tag information stored in a tag memory of each pipeline varies,
wherein the tag information stored in the tag memory of each of the M pipelines is a subset of tag information of the cache, and
wherein each piece of tag information of the cache corresponds to each memory block in the data memory in a one-to-one manner.

2. The cache according to claim 1, wherein the tag information of the cache is divided into at least two sets, and wherein the tag information stored in the tag memory in each pipeline is obtained by equally dividing tag information in each set of the cache according to a total quantity M of pipelines.

3. The cache according to claim 1, wherein when the address matching the first tag address does not exist in the at least one target tag address, the controller is further configured to:
determine whether the other pipeline have processed the first lookup request;
send the first lookup request to the next-level device for processing when all other pipelines have processed the first lookup request; and
send the first lookup request at an $(N+1)^{th}$ moment to any one of at least one pipeline that has not processed the first lookup request for processing when the at least one pipeline in the other pipelines has not processed the first lookup request.

4. The cache according to claim 3, wherein when determining whether the other pipeline have processed the first lookup request, the controller further configured to:
detect whether the first lookup request carries indication information, wherein the indication information comprises at least one of a quantity of times the first lookup request has been processed or identification information of a pipeline that has processed the first lookup request;
determine that all the other pipelines have processed the first lookup request when the first lookup request carries the indication information and the indication information indicates that the first lookup request has been processed M−1 times;
determine that the at least one pipeline that has not processed the first lookup request exists in the other pipelines when the first lookup request carries the indication information and the indication information indicates that the quantity of times the first lookup request has been processed is less than M−1; and
determine that the other pipelines have not processed the first lookup request when the first lookup request does not carry the indication information.

5. The cache according to claim 4, wherein when the indication information indicates that the quantity of times the first lookup request has been processed is less than M−1, and when the first lookup request is sent to the other pipelines for processing, the controller is further configured to:
update the quantity of times the first lookup request has been processed in the indication information;
update identification information of the any one pipeline into the indication information; or
update the quantity of times the first lookup request has been processed in the indication information and the identification information of the any one pipeline into the indication information.

6. The cache according to claim 4, wherein the first lookup request does not carry the indication information, wherein the first lookup request is sent to the other pipelines for processing, wherein the controller is further configured to set the first lookup request to carry the indication information, and wherein the indication information indicates that the first lookup request is processed for a first time, indicates identification information of the any one pipeline that has processed the first lookup request, or indicates that the first lookup request is processed for the first time and the identification information of the any one pipeline that has processed the first lookup request.

7. The cache according to claim 1, wherein the controller is further configured to read data according to a first target address from a memory block corresponding to the first target address and is in the data memory when the determining circuit determines that the first target address matching the first tag address exists in the at least one target tag address.

8. The cache according to claim 1, wherein when M is equal to 2, the preset arbitration policy comprises:
setting a lookup request from an upstream device as the first lookup request when the at least one lookup request comprises only the lookup request from the upstream device;
setting a lookup request from the other pipeline as the first lookup request when the at least one lookup request comprises only the lookup request from the other pipeline; and
setting the lookup request from the other pipeline as the first lookup request, and temporarily storing the lookup request from the upstream device when the at least one lookup request comprises the lookup request from the upstream device and the lookup request from the other pipeline.

9. The cache according to claim 1, wherein when M is greater than 2, the preset arbitration policy comprises:
setting a lookup request from a pipeline of a highest priority in other pipelines as the first lookup request according to preset priorities of the pipelines, and temporarily storing a remaining lookup request when the at least one lookup request comprises only at least two lookup requests from the other pipelines; and
setting the lookup request from the pipeline of the highest priority in the other pipelines as the first lookup request, and temporarily storing a lookup request from an upstream device and a lookup request from a pipeline other than the pipeline of the highest priority in the other pipelines when the at least one lookup request comprises the lookup request from the upstream device and at least two lookup requests from the other pipelines.

10. The cache according to claim 8, wherein when the at least one lookup request further comprises a temporarily stored lookup request, the preset arbitration policy further comprises:
  setting a lookup request from a pipeline of a highest priority and is in the at least one lookup request as the first lookup request; and
  temporarily storing a lookup request other than the first lookup request in the at least one lookup request, wherein priorities of the other pipelines are higher than a priority of the upstream device.

11. The cache according to claim 1, further comprising an enable circuit coupled to each arbitration circuit and configured to:
  determine, at the $N^{th}$ moment, the any one pipeline processing the at least one lookup request and is in the M pipelines; and
  enable the any one pipeline to trigger the arbitration circuit in the any one pipeline to receive the at least one lookup request.

12. A processing method for a multi-way set associative cache, wherein the cache comprises M pipelines, wherein M is a positive integer greater than or equal to 2, and wherein a processing method for any one pipeline comprises:
  receiving at least one lookup request at an $N^{th}$ moment;
  determining a first lookup request among the at least one lookup request according to a preset arbitration policy, wherein N is a positive integer, and wherein the first lookup request carries a first index address and a first tag address;
  looking up locally stored tag information according to the first index address in order to acquire at least one target tag address corresponding to the first index address; and
  sending the first lookup request to a next-level device or another pipeline except the any one pipeline for processing when an address matching the first tag address does not exist in the at least one target tag address,
  wherein tag information stored in each of the M pipelines is a subset of tag information of the cache, and
  wherein each piece of tag information of the cache corresponds to each memory block in a data memory in the cache in a one-to-one manner.

13. The method according to claim 12, wherein the tag information of the cache is divided into at least two sets, and wherein the tag information stored in each pipeline is obtained by equally dividing tag information in each set of the cache according to a total quantity M of pipelines.

14. The method according to claim 12, wherein sending the first lookup request to the next-level device or the other pipeline except the any one pipeline for processing comprises:
  determining whether the other pipeline have processed the first lookup request;
  sending the first lookup request to the next-level device for processing when all other pipelines have processed the first lookup request; and
  sending the first lookup request at an $(N+1)^{th}$ moment to any one of at least one pipeline that has not processed the first lookup request when the at least one pipeline in the other pipelines has not processed the first lookup request.

15. The method according to claim 14, wherein determining whether the other pipelines have processed the first lookup request comprises:
  detecting whether the first lookup request carries indication information, wherein the indication information comprises at least one of a quantity of times the first lookup request has been processed, or identification information of a pipeline that has processed the first lookup request;
  determining that all the other pipelines have processed the first lookup request when the first lookup request carries the indication information and the indication information indicates that the first lookup request has been processed M−1 times;
  determining that the at least one pipeline that has not processed the first lookup request exists in the other pipelines when the first lookup request carries the indication information and the indication information indicates that the quantity of times the first lookup request has been processed is less than M−1; and
  determining that the other pipelines have not processed the first lookup request when the first lookup request does not carry the indication information.

16. The method according to claim 15, wherein when the indication information indicates that the quantity of times the first lookup request has been processed is less than M−1, and when the first lookup request is sent to the other pipelines for processing, the method further comprises:
  updating the quantity of times the first lookup request has been processed in the indication information;
  updating identification information of the any one pipeline into the indication information; or
  updating the quantity of times the first lookup request has been processed in the indication information and the identification information of the any one pipeline into the indication information.

17. The method according to claim 15, wherein when the first lookup request does not carry the indication information, and when the first lookup request is sent to the other pipelines for processing, the method further comprises setting the first lookup request to carry indication information, wherein the indication information indicates that the first lookup request is processed for a first time, indicates identification information of the any one pipeline that has processed the first lookup request or indicates that the first lookup request is processed for the first time and the identification information of the any one pipeline that has processed the first lookup request.

18. The method according to claim 12, wherein the method further comprises reading data according to a first target address from a memory block corresponding to the first target address and is in the data memory when the first target address matching the first tag address exists in the at least one target tag address.

19. The method according to claim 12, wherein when M is equal to 2, the preset arbitration policy comprises:
  setting a lookup request from an upstream device as the first lookup request when the at least one lookup request comprises only the lookup request from the upstream device;
  setting a lookup request from the other pipeline as the first lookup request when the at least one lookup request comprises only the lookup request from the other pipeline; and
  setting the lookup request from the other pipeline as the first lookup request, and temporarily storing the lookup request from the upstream device when the at least one lookup request comprises the lookup request from the upstream device and the lookup requests from the other pipeline.

20. The method according to claim 12, wherein when M is greater than 2, the preset arbitration policy comprises:

setting a lookup request from a pipeline of a highest priority in other pipelines as the first lookup request according to preset priorities of the other pipelines, and temporarily storing a remaining lookup request when the at least one lookup request comprises only at least two lookup requests from the other pipelines; and setting the lookup request from the pipeline of the highest priority in the other pipelines as the first lookup request, and temporarily storing a lookup request from an upstream device and a lookup request from a pipeline other than the pipeline of the highest priority in the other pipelines when the at least one lookup request comprises the lookup request from the upstream device and at least two lookup requests from the other pipelines.

* * * * *